(12) United States Patent
Tusnial

(10) Patent No.: US 8,768,298 B1
(45) Date of Patent: Jul. 1, 2014

(54) SYSTEM, METHOD, AND COMPUTER PROGRAM FOR PERSONA BASED TELECOMMUNICATION SERVICE SUBSCRIPTIONS

(75) Inventor: Aloke Tusnial, Johns Creek, GA (US)

(73) Assignee: Amdocs Software Systems Limited, Dublin (IE)

( * ) Notice: Subject to any disclaimer, the term of this patent is extended or adjusted under 35 U.S.C. 154(b) by 65 days.

(21) Appl. No.: 13/330,587

(22) Filed: Dec. 19, 2011

(51) Int. Cl.
*H04M 11/00* (2006.01)

(52) U.S. Cl.
USPC ............ 455/406; 455/405; 455/407; 455/408

(58) Field of Classification Search
USPC ............... 455/405–409; 379/114.01–114.09, 379/114.1, 114.11–114.19, 114.2, 379/114.21–114.29, 120, 121.01–121.06, 379/127.01–127.06, 130–132; 705/40; 725/1–8
See application file for complete search history.

(56) References Cited

U.S. PATENT DOCUMENTS

| 7,437,677 | B1 | 10/2008 | Capps et al. |
| 2003/0014631 | A1* | 1/2003 | Sprague ......................... 713/168 |
| 2004/0210524 | A1* | 10/2004 | Benenati et al. ................ 705/40 |
| 2007/0061730 | A1* | 3/2007 | O'Mahony et al. ........... 715/733 |
| 2008/0183604 | A1* | 7/2008 | Chou ............................... 705/30 |
| 2010/0210304 | A1* | 8/2010 | Huslak .......................... 455/558 |
| 2011/0053574 | A1 | 3/2011 | Rice |

* cited by examiner

*Primary Examiner* — Dinh P Nguyen
(74) *Attorney, Agent, or Firm* — Zilka-Kotab, PC

(57) ABSTRACT

A system, method, and computer program product are provided for persona based telecommunication service subscriptions. Usage of a device is detected, and one of a plurality of personas configured for the device is determined to be associated with the usage of the device. Additionally, at least one telecommunication service subscribed to by the persona is identified. Further, the usage of the device is serviced using the identified telecommunication service.

16 Claims, 5 Drawing Sheets

SYSTEM, METHOD, AND COMPUTER PROGRAM FOR PERSONA BASED TELECOMMUNICATION SERVICE SUBSCRIPTIONS

FIELD OF THE INVENTION

The present invention relates to telecommunication services, and more particularly to usage of telecommunication services.

BACKGROUND

Typically, a telecommunications enabled device has a subscription to a telecommunication service. Telecommunications-based usage of the device is then serviced by the telecommunication service to which the device subscribes. Unfortunately, the ability to subscribe to and use telecommunication services has generally been limited.

For example, a user of the telecommunication service typically registers the device under a subscription to the service, such that the device is serviced according to the subscription. However, when multiple subscriptions are desired, where each subscription is to a different service and possibly different service provider, the user has conventionally either had to carry multiple devices each operating under a different subscription or the user has had to manually connect the device to a desired one of the services.

There is thus a need for addressing these and/or other issues associated with the prior art.

SUMMARY

A system, method, and computer program product are provided for persona based telecommunication service subscriptions. Usage of a device is detected, and one of a plurality of personas configured for the device is determined to be associated with the usage of the device. Additionally, at least one telecommunication service subscribed to by the persona is identified. Further, the usage of the device is serviced using the identified telecommunication service.

DETAILED DESCRIPTION

Figure 1:
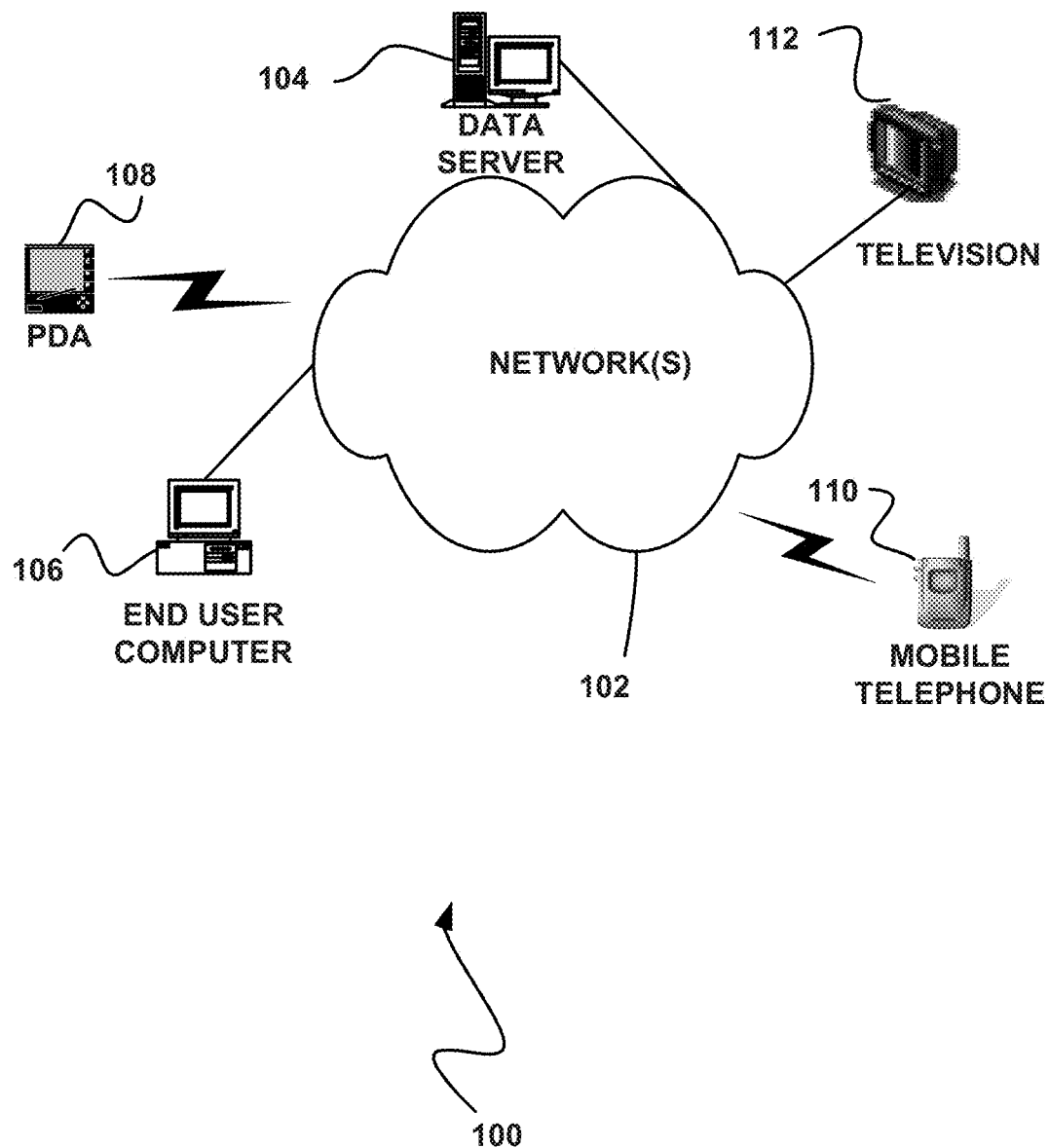
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
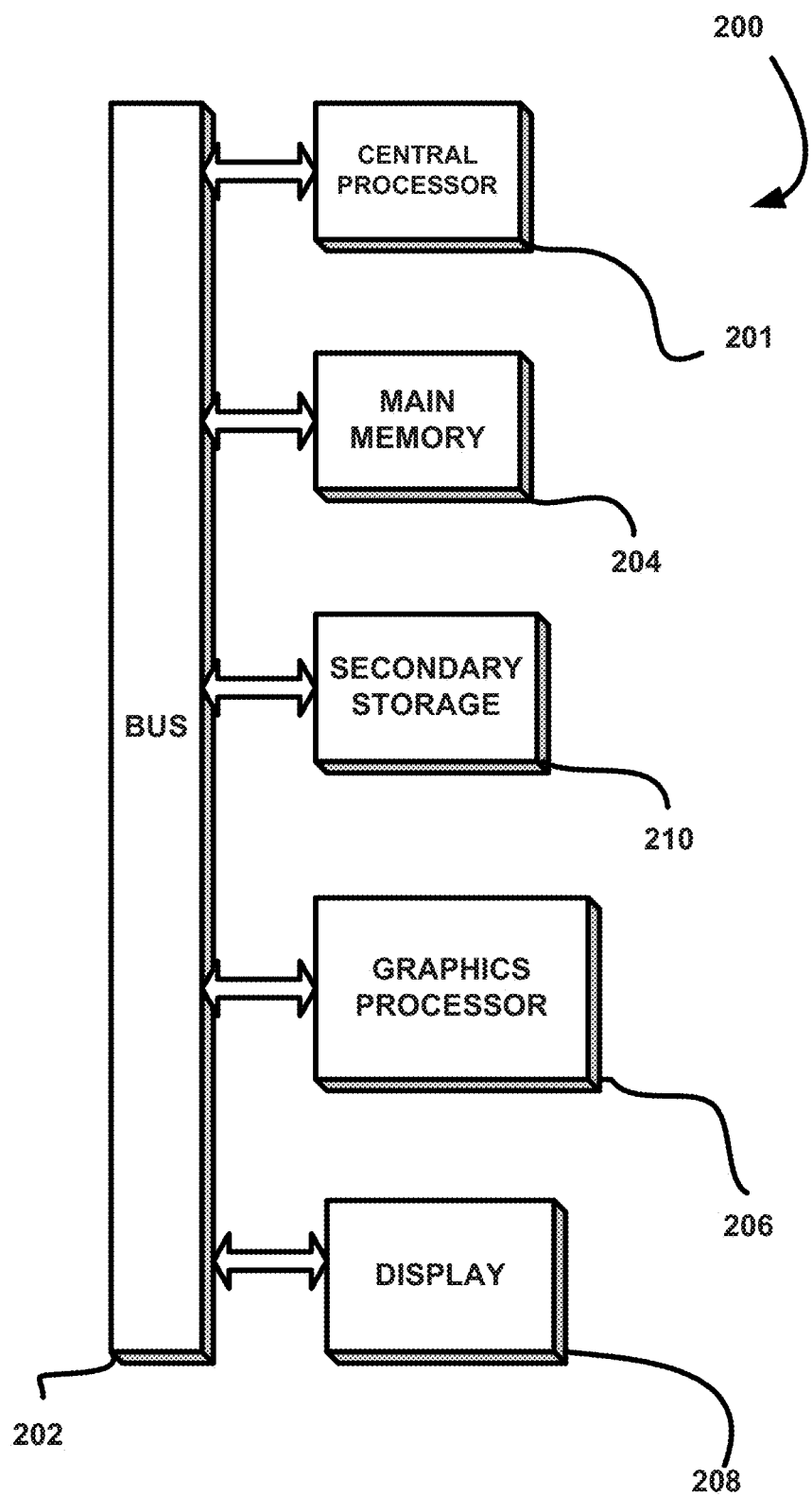
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
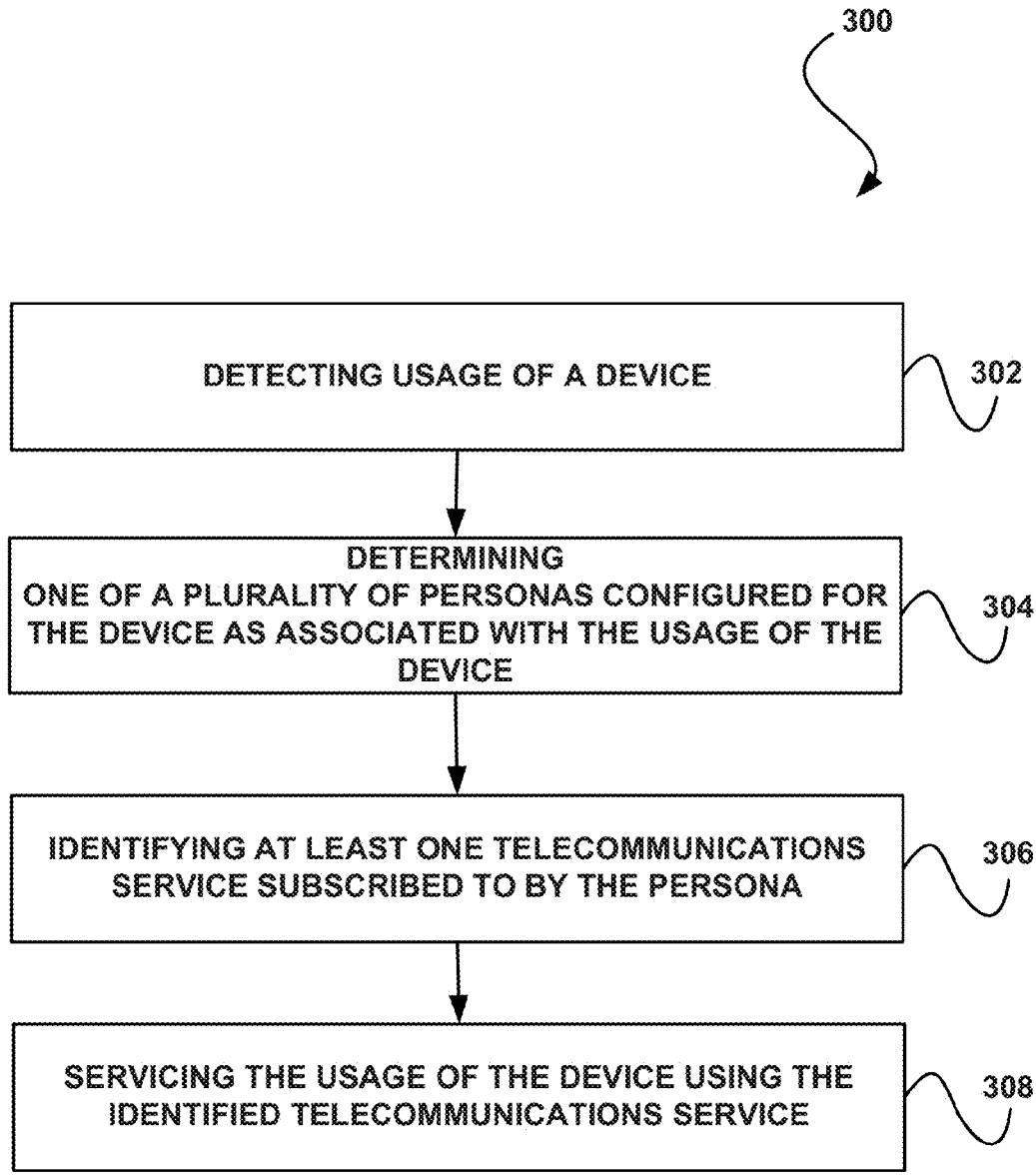
FIG. 3 illustrates a method for using persona based telecommunication service subscriptions, in accordance with one embodiment.

FIG. 3 illustrates a method 300 for using persona based telecommunication service subscriptions, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, usage of a device is detected. In the context of the present description, the device includes any telecommunications enabled device. For example, the device may be a mobile telephone, laptop computer, tablet computer, a PDA or any mobile or cellular device which is capable of being used by a user for telecommunications purposes.

To this end, usage of the device may include execution of any functionality of the device. Just by way of example, usage of the device may include an attempt to use a telecommunication service of the device. Such telecommunication service may include voice (e.g. a telephone call), data (e.g. Internet access), messaging (e.g. text messaging), etc.

Additionally, as shown in operation 304, one of a plurality of personas configured for the device is determined to be associated with the usage of the device. The personas configured for the device may each be a specific (i.e. different) device configuration. Thus, each persona may be configured to use a different set of (e.g. one or more of) telecommunication service(s), a different set of (e.g. one or more of) application(s), a different set of settings (e.g. interfaces), etc. It should be noted that the personas may be configured by the user of the device (e.g. including an owner of the persona or the Telecommunication Service Provider), as an option.

In one embodiment, the personas may include a personal persona (i.e. a persona the user uses when acting in a personal capacity). In another embodiment, the personas may include a corporate persona (i.e. a persona the user uses when acting in a professional capacity). In yet another embodiment, the personas are configured by a user of the device an organization specific persona (i.e. a persona the user uses when acting on behalf of the organization).

Moreover, the personas may be configured in any manner that allows them to be selectively and independently associated with usage of the device. In one embodiment, the personas may be configured by installing different containers on the device which separate device configurations for the personas. In another embodiment, the personas may be configured by creating attributes, policies, etc. in a network or information technology system which differentiate the personas. In yet another embodiment, the personas may be configured by having multiple homes on the device, one for each persona.

As an option, the persona may be determined to be associated with the usage of the device using information stored on the device. For example, the device may store information indicating which one of the personas is currently active on the device. In one embodiment, the persona may be determined as associated with the usage of the device (e.g. indicated as currently active on the device) in response to a user selection of the persona via the device, for example, where the use selection is for the purpose of using the device in accordance with the persona. Of course, however, the persona may be determined to be associated with the usage of the device in any desired manner.

Further, at least one telecommunication service subscribed to by the persona is identified. Note operation 306. As noted above, the telecommunication service may be voice, data, messaging, etc., and each of the personas may subscribe to a different set of telecommunication services. Thus, the subscription may be a registration for the persona to use the telecommunication service. For example, the user may subscribe the persona to the telecommunication service.

In this way, the telecommunication service may be subscribed to by the persona by configuring the persona to use the at least one telecommunication service. As an option, each of the personas may subscribe to a telecommunication service provided by a different service provider (i.e. carrier). Accordingly, each of the personas may have a telecommunication service agreement with a different service provider, and thus may be responsible to (e.g. to pay, etc.) different service providers.

Still yet, as shown in operation 308, the usage of the device is serviced using the identified telecommunication service. Servicing usage of the device using the identified telecommunication service may include enabling network communications with the device using the identified telecommunication service. For example, the user may use the device to send voice, data, messages, etc. via the identified telecommunication service.

In this way, multiple personas may be configured for a single device where each persona has a subscription to a different set of telecommunication services optionally provided by different service providers. The device may then automatically use the telecommunication service specific to the persona associated with usage of the device (e.g. selected for use by a user of the device).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
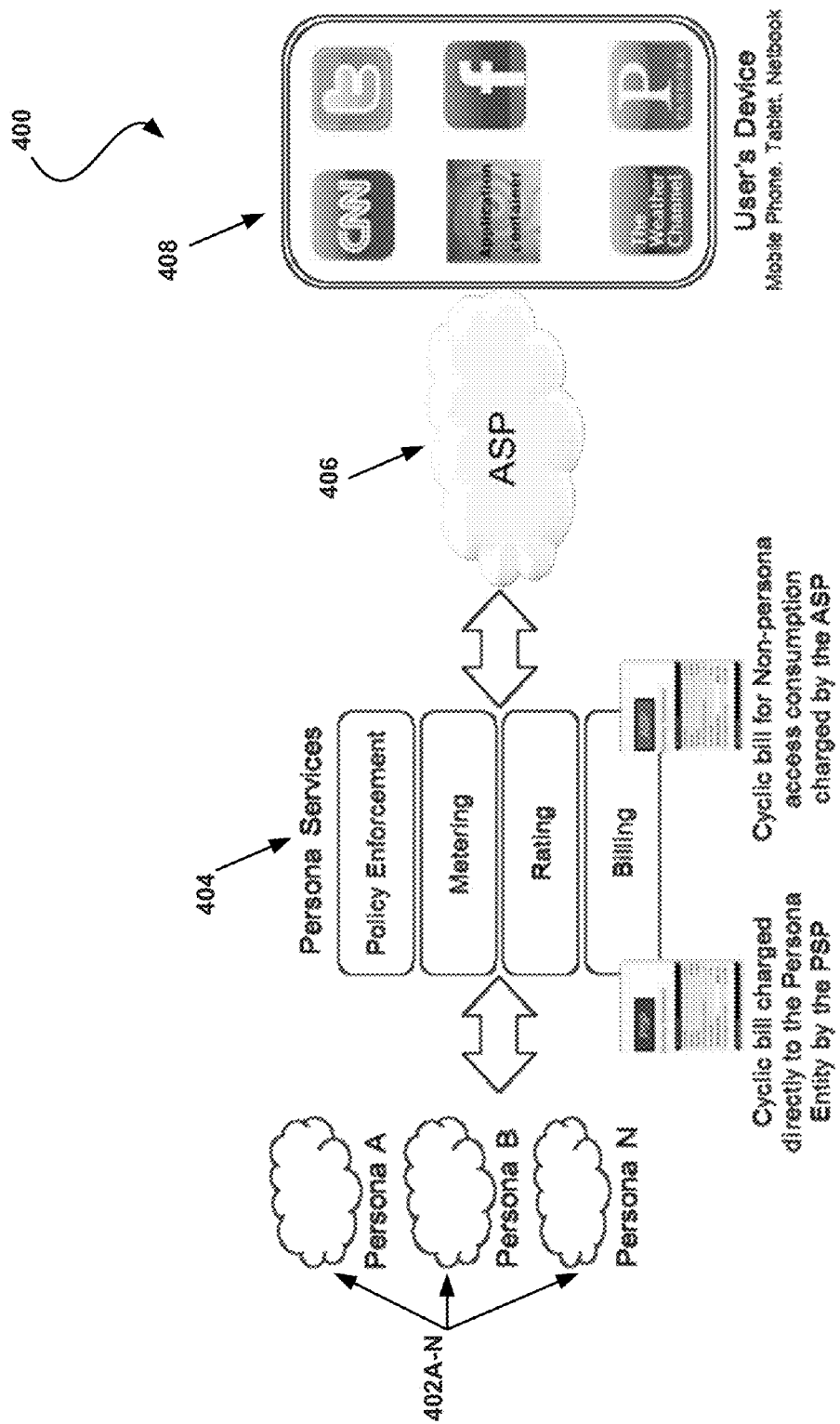
FIG. 4 illustrates a system providing persona based telecommunication service subscriptions, in accordance with another embodiment.

FIG. 4 illustrates a system 400 providing persona based telecommunication service subscriptions, in accordance with another embodiment. As an option, the system 400 may be implemented in the context of the details of FIGS. 1-3. Of course, however, the system 400 may be implemented in any desired environment. Again, the aforementioned definitions may equally apply to the description below.

As shown, multiple personas 402A-N are configured for a user's device 408. In the present embodiment, each persona subscribes to a telecommunication service of a different service provider. In this way, a user of the device 408 can switch between which one of the personas 402A-N is used for the device 408 (and/or may optionally use them from any device).

For each of the personas 402A-N, the user can choose to receive telecommunication service from any service provider, irrespective of which service provider provides the device with the access service. The access service may be the actual network via which the device 408 directly communications to send/receive telecommunications (e.g. voice, data and/or messaging).

An access service provider (ASP) 406 may be the service provider providing the access service to the user and may have the primary relationship with the user. The primary relationship may be a direct billing relationship between the user and the ASP.

The persona service provider (PSP) may be the service provider that provides and bills for a telecommunication service to one or more of the personas 402A-N having a subscription to the telecommunication service. The PSP may have a secondary relationship with the user and a primary relationship with the entity that the persona identifies (e.g. enterprise, charity, volunteer organization, personal, etc.). Thus, the PSP may have a direct billing relationship with one of the personas having a subscription to its telecommunication service.

It should be noted that any service provider can perform the role of an ASP 406 and/or a PSP. In addition, the service provider may be an ASP 406 and/or a PSP for one or more of the personas 402A-N. More details regarding the ASP 406 and PSP will be described below with reference to FIG. 5.

Persona services 404 may be provided by each service provider. The persona services 404 may include policy enforcement and/or metering of usage of the device 408 (i.e. for allowing/denying access based on the policy). The personal services 404 may also include rating of usage of the device 408 for determining a cost for the usage of the service. In addition, the persona services 404 may include billing for the usage of the service by the device 408.

As shown, a cyclical bill from a PSP providing a service to one of the personas 402A-N can be charged directly to the one of the personas 402A-N. In addition, a cyclical bill for non-persona access consumption (consumption of a service by the user while not under the guise of one of the personas) may be charged to the user by the ASP 406.

Figure 5:
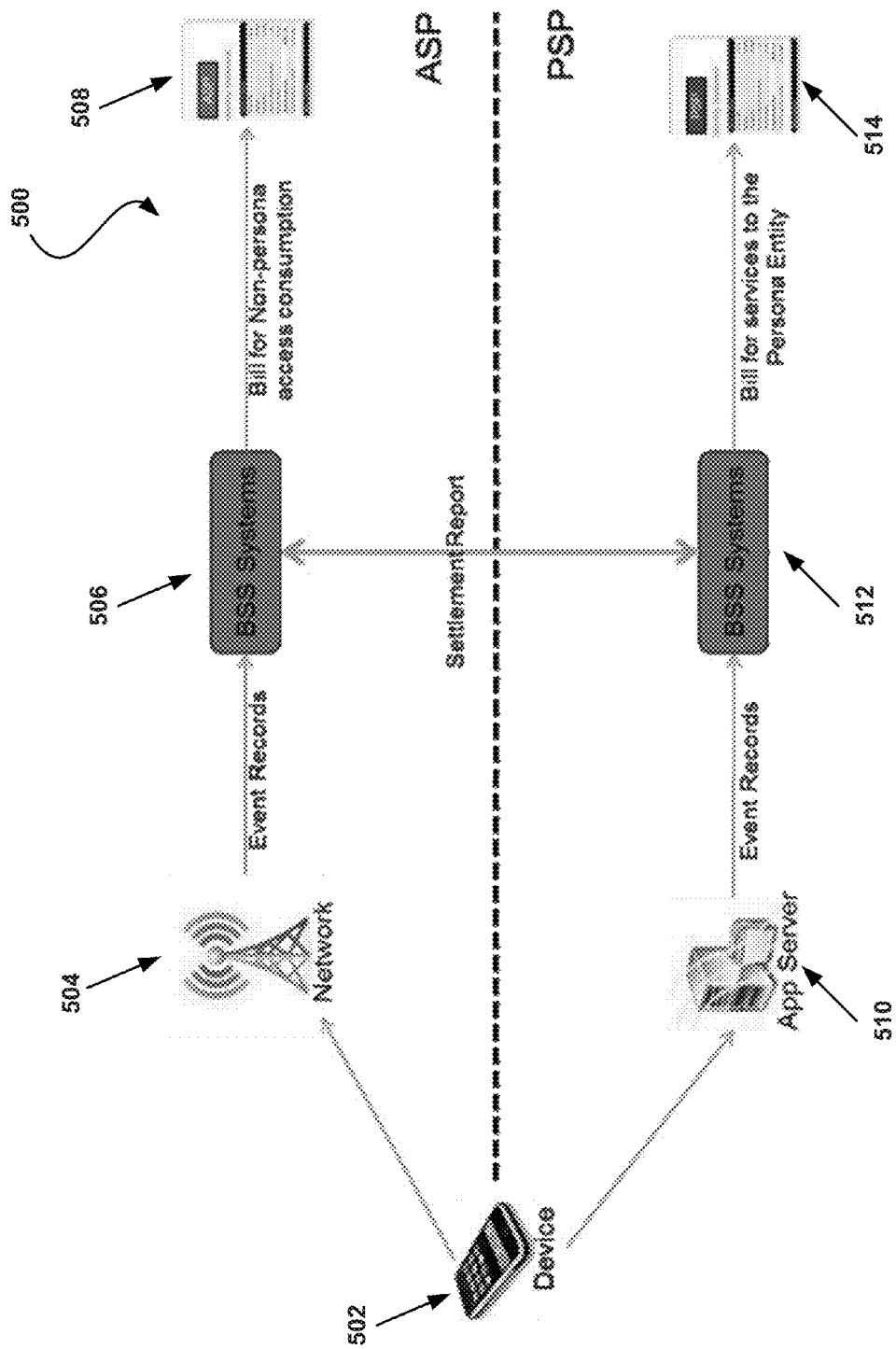
FIG. 5 illustrates a system for billing with respect to persona based telecommunication service subscriptions, in accordance with yet another embodiment.

FIG. 5 illustrates a system 500 for billing with respect to persona based telecommunication service subscriptions, in accordance with yet another embodiment. As an option, the system 500 may be implemented in the context of the details of FIGS. 1-3. Of course, however, the system 500 may be implemented in any desired environment. Yet again, the aforementioned definitions may equally apply to the description below.

As shown, a device 502 of a user communicates with both an ASP and a PSP. With respect to the ASP, the device 502 consumes a telecommunication service via a network 504.

The consumption may be by the user under any one of a plurality of personas configured for the device 502 which subscribe to the telecommunication service. Thus, usage of the device 502 may be serviced using the telecommunication service identified for the persona being used by the user. The billing for the usage may also be provided.

Consumption of the service is reported to a billing/settlement system (BSS) 506 of the ASP via event records. If the ASP is a service provider providing the consumed telecommunication service, then the BSS 506 of the ASP generates a bill 508 for the consumption and sends the bill 508 to the user for non-persona access consumption.

If the ASP only provides an access service allowing the device 502 to access a telecommunication service of the PSP, then the ASP and the PSP may settle with each other, while only the PSP bills for the consumption. For example, the ASP may bill the PSP for providing the access service, while the PSP may use an application server 510 to identify that a persona subscribing to the its telecommunication service is being used to consume the telecommunication service, and in response report the consumption to a BSS 512 of the PSP via event records, which can then generate a bill 514 for the persona.

The ASP and PSP may settle with each other for the consumption in any desired manner. For example, the PSP may act as an MVNO (Mobile Virtual Network Operator) to the ASP and may buy access service in bulk from the ASP. As another option, the PSP may have a roaming agreement with the ASP and the persona subscribing to the service of the PSP could be defined as roaming in the ASP's network. In either situation, the PSP and the ASP may settle with each other through the use of settlement and/or roaming records and files. For example, roaming records may be provided by a service provider of the telecommunication service, and/or settlement records may be provided by a service provider of the telecommunication service.

Just by way of example, a user could buy a phone that works on a network of a first service provider (and may or may not subscribe to a service from the first service provider). In addition, the user may subscribe a personal persona to telecommunication services from a second service provider. Further, the user may subscribe an enterprise persona to telecommunication services from a third service provider.

In this example, the user may get a bill from the second service provider for services consumed under the personal persona, and another bill from the third service provider for services consumed under the enterprise persona. The user may only get a bill from the first service provider if services of the first service provider are subscribed to and consumed when the user is not under the guise (i.e. has not selected) any of the configured personas.

In addition, the first service provider, second service provider, and third service provider may settle with each other for the user consumption. In one embodiment, the settlement may be handled by acting under an agreement where consumption of the second service provider services and the third service provider services are considered roaming on the first service provider network. In another embodiment, the settlement may be handled by acting under an agreement where the second service provider and the third service provider act as an MVNO on the first service provider network.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for detecting usage of a device utilizing a particular persona of a plurality of personas configured for the device, wherein each of the personas is configured for the device by installing different containers on the device that separate configurations of the device for the plurality of personas;
   computer code for determining that the usage of the device includes access and usage of a telecommunication service, where a first telecommunication service provider provides an access service enabling the device to access the telecommunication service and a second telecommunication service provider associated with the particular persona configured for the device provides the telecommunication service accessed utilizing the access service; and
   computer code for determining a single billing charge from the second telecommunication provider, where the single billing charge is for both the use of the access service of the first telecommunication service provider and the use of the telecommunication service of the second telecommunication service provider;
   wherein each of the personas are associated with a different telecommunication service of a different telecommunication service provider that meters usage of the device while the associated persona is being used, and each of the telecommunication services are accessed through the access service of the first telecommunication service provider, wherein the first telecommunication service provider bills each of the different telecommunication service providers for providing the access service.

2. The computer program of claim 1, wherein the device is a mobile telephone, a tablet, a PDA or any mobile or cellular device.

3. The computer program of claim 1, wherein the plurality of personas include a personal persona and a corporate persona.

4. The computer program of claim 1, wherein the computer program is operable such that the particular persona is configured by a user of the device, including an owner of the particular persona or the second telecommunication service provider.

5. The computer program of claim 1, wherein the computer program is operable such that the particular persona is determined as associated with the usage of the device using information stored on the device.

6. The computer program of claim 1, wherein the computer program is operable such that the particular persona is determined as associated with the usage of the device in response to a user selection of the particular persona via the device.

7. The computer program of claim 1, wherein the telecommunication service includes at least one of voice, data, and messaging.

8. The computer program of claim 1, wherein the computer program is operable such that the telecommunication service is subscribed to by the particular persona by configuring the particular persona to use the telecommunication service.

9. The computer program of claim 1, wherein the computer program is operable such that the single billing charge is provided to the particular persona.

10. The computer program of claim 1, wherein roaming records are provided by the second telecommunication service provider that provides the telecommunication service.

11. The computer program of claim 1, wherein settlement records are provided by the first telecommunication service provider of the access service.

12. A method, comprising:
- detecting usage of a device utilizing a particular persona of a plurality of personas configured for the device, wherein each of the personas is configured for the device by installing different containers on the device that separate configurations of the device for the plurality of personas;
- determining that the usage of the device includes access and usage of a telecommunication service, where a first telecommunication service provider provides an access service enabling the device to access the telecommunication service and a second telecommunication service provider associated with the particular persona configured for the device provides the telecommunication service accessed utilizing the access service; and
- determining a single billing charge from the second telecommunication provider, where the single billing charge is for both the use of the access service of the first telecommunication service provider and the use of the telecommunication service of the second telecommunication service provider;
- wherein each of the personas are associated with a different telecommunication service of a different telecommunication service provider that meters usage of the device while the associated persona is being used, and each of the telecommunication services are accessed through the access service of the first telecommunication service provider, wherein the first telecommunication service provider bills each of the different telecommunication service providers for providing the access service.

13. A system, comprising:
- a device for detecting usage of the device utilizing a particular persona of a plurality of personas configured for the device, wherein each of the personas is configured for the device by installing different containers on the device that separate configurations of the device for the plurality of personas;
- a processor for determining that the usage of the device includes access and usage of a telecommunication service, where a first telecommunication service provider provides an access service enabling the device to access the telecommunication service and a second telecommunication service provider associated with the particular persona configured for the device provides the telecommunication service accessed utilizing the access service; and
- a billing/settlement system (BSS) for determining a single billing charge from the second telecommunication provider, where the single billing charge is for both the use of the access service of the first telecommunication service provider and the use of the telecommunication service of the second telecommunication service provider;
- wherein each of the personas are associated with a different telecommunication service of a different telecommunication service provider that meters usage of the device while the associated persona is being used, and each of the telecommunication services are accessed through the access service of the first telecommunication service provider, wherein the first telecommunication service provider bills each of the different telecommunication service providers for providing the access service.

14. The system of claim 13, wherein the processor is coupled to memory via a bus.

15. The computer program of claim 1, wherein each of the personas is subscribed to the telecommunication service associated with the persona, such that each of the personas has a different telecommunication service agreement with the associated telecommunication service provider.

16. The computer program of claim 1, wherein the first telecommunication service provider only bills a user of the device when the device uses the access network without a prior selection of one of the plurality of personas configured for the device.

* * * * *